US012582198B2

(12) United States Patent
Culp

(10) Patent No.: US 12,582,198 B2
(45) Date of Patent: Mar. 24, 2026

(54) ORTHOPEDIC INSOLES FOR USE IN OPEN FOOTWEAR

(71) Applicant: Melinda Culp, Milburn, NJ (US)

(72) Inventor: Melinda Culp, Milburn, NJ (US)

(73) Assignee: Melinda Culp, Milburn, NJ (US)

( * ) Notice: Subject to any disclaimer, the term of this patent is extended or adjusted under 35 U.S.C. 154(b) by 35 days.

(21) Appl. No.: 18/234,439

(22) Filed: Aug. 16, 2023

(65) Prior Publication Data

US 2023/0389654 A1    Dec. 7, 2023
US 2025/0169575 A9    May 29, 2025

Related U.S. Application Data

(63) Continuation of application No. 18/203,211, filed on May 30, 2023, which is a continuation of application No. 16/902,131, filed on Jun. 15, 2020, now abandoned.

(60) Provisional application No. 62/861,737, filed on Jun. 14, 2019.

(51) Int. Cl.
| | |
|---|---|
| *A43B 17/00* | (2006.01) |
| *A43B 3/12* | (2006.01) |
| *A43B 17/08* | (2006.01) |
| *A43B 17/14* | (2006.01) |
| *B32B 7/12* | (2006.01) |
| *B32B 9/02* | (2006.01) |
| *B32B 27/40* | (2006.01) |

(52) U.S. Cl.
CPC ............ *A43B 17/006* (2013.01); *A43B 17/08* (2013.01); *A43B 17/14* (2013.01); *B32B 7/12* (2013.01); *B32B 9/025* (2013.01); *B32B 27/40*
(2013.01); *B32B 2250/05* (2013.01); *B32B 2317/02* (2013.01); *B32B 2317/08* (2013.01); *B32B 2375/00* (2013.01)

(58) Field of Classification Search
CPC ....... A43B 17/003; A43B 17/006; A43B 3/12; B32B 9/025; B32B 9/02; B32B 2250/05; B32B 2317/02
See application file for complete search history.

(56) References Cited

U.S. PATENT DOCUMENTS

| | | | | |
|---|---|---|---|---|
| 5,860,229 | A * | 1/1999 | Morgenstern | ........ A43B 7/1415 36/141 |
| 7,559,157 | B2 * | 7/2009 | Polegato Moretti | ..... A43B 7/06 36/30 R |
| 9,215,908 | B1 * | 12/2015 | Malmoux | .............. A43B 13/16 |
| 9,538,812 | B2 * | 1/2017 | Torrance | .............. A43B 3/0031 |
| 2004/0103561 | A1 * | 6/2004 | Campbell | .............. A43B 23/17 36/155 |

(Continued)

*Primary Examiner* — Joanna Pleszczynska
(74) *Attorney, Agent, or Firm* — Gearhart Law LLC

(57) ABSTRACT

A multi-layered orthopedic insole has at least four layers. The first layer is leather, the second layer is molded high-density recycled latex foam, the third layer is a molded, rigid density cork-EVA (Ethylene-Vinyl Acetate) footbed, and the fourth or bottom layer is moleskin or moleskin coated to provide a natural grip for gripping a shoe insole. The different layers are fused to form the orthopedic insole of the present invention. The third layer of the multi-layered insole is generally thicker than the other layers and includes sidewalls covered in a leather wrap. The multi-layered orthopedic insole is specifically designed to provide comfort and support to a user's foot using the specified materials, shapes, and contours.

12 Claims, 8 Drawing Sheets

(56)                     References Cited

U.S. PATENT DOCUMENTS

| 2007/0124960 A1* | 6/2007 | Friedman ............. | A43B 1/0009 |
| | | | 36/35 R |
| 2012/0055045 A1* | 3/2012 | Wang ................... | A43B 7/1445 |
| | | | 36/88 |
| 2016/0331070 A1* | 11/2016 | Williams ............... | A61H 39/04 |
| 2018/0103716 A1* | 4/2018 | Tsai ....................... | A43B 17/14 |

\* cited by examiner

TOP

LATERAL

BOTTOM

MEDIAL

REAR

212

214

312

310

310

FRONT

312

214

ORTHOPEDIC INSOLES FOR USE IN OPEN FOOTWEAR

CROSS-REFERENCE TO RELATED APPLICATIONS

The present application is a continuation-in-part (CIP) application and claims priority from a continuation application Ser. No. 18/203,211 filed on May 30, 2023, which, in turn, claims priority from non-provisional application Ser. No. 16/902,131 filed on Jun. 15, 2020, which, in turn, claims priority from provisional application 62/861,737 filed on Jun. 14, 2019 all of which are hereby fully incorporated by reference into this application in their entirety.

FIELD OF THE EMBODIMENTS

This invention relates to orthopedic insoles and, in particular, to a multi-layered orthopedic insole having a top layer of leather, a second layer of high-density latex foam, a third layer of cork and Ethylene-Vinyl Acetate (EVA), and a fourth layer of moleskin or moleskin coating.

BACKGROUND OF THE EMBODIMENTS

Plantar Fasciitis has become one of the most common foot problems among older adults. The disorder causes heel pain and involves inflammation of a thick band of tissue that runs across the bottom of each foot, connecting the heel bone to the toes (plantar fascia). Those suffering from plantar fasciitis often complain of stabbing pain that usually occurs with a person's first steps in the morning. As the person gets up and starts moving, the pain may subside, but it may return after long periods of standing or when first standing up after sitting for an extended period.

People suffering from plantar fasciitis or other foot-related problems have sought ways to alleviate their pain, including orthopedic insoles that are designed to provide relief and help restore normal mobility. Although some insole products have proven useful in reducing pain and helping users walk, many are either unsightly or tend to sacrifice style for comfort, especially those designed for open toe shoes. In addition, many insoles are too soft to properly distribute weight on the foot or are too rigid to provide relief from pain. Such insoles (i.e., too soft, or too rigid) can cause more pain and discomfort instead of helping to relieve discomfort. There is therefore a need for an insole that is soft enough to provide comfort while being rigid enough to provide necessary support and properly distribute a user's weight. There is also a need for an insole that fits aesthetically into a variety of different open toe shoe designs so that a user can feel relief from pain while enjoying attractive and stylish open toe shoes.

Examples of related art are described below:

U.S. Pat. No. 9,974,353 generally describes a convertible shoe that consists of a top portion having a stylized upper, a footbed, and an underside with bottom side attachment, an insert with top side attachment and a bottom side attachment; and a bottom portion having a top side attachment and a tread on the bottom. The top side attachment of the bottom portion and insert are identical, and the bottom side attachment of the top portion and insert are identical. The bottom side attachment is sized and configured to correspond to, and attach to, the top side attachment, such that the top portion can attach directly to the bottom portion to create a low-heeled shoe, or attach to the insert which is attached to the bottom portion to create a high-heeled shoe.

U.S. Patent Publication No. 2008/0010861 generally describes an orthotic device that is designed to be reused and reapplied in open shoes and includes an adhesive layer which securely, but temporarily, bonds the insole to a shoe. In some embodiments, the insole both supports and cushions a foot. In other embodiments, the insole solely cushions the foot. The supporting insoles include an arch support and a heel lift. The cushioning insoles include a flat sole pad, a contoured sole pad, a ball of foot pad and a heel spur pad. In some embodiments, a textile covering is included over the insole.

U.S. Patent Publication No. 2012/0210605 generally describes a foot support for use with a human foot having a forefoot portion that supports the foot beneath the metatarsal heads and an arched midfoot portion that supports the foot beneath the metatarsal, cuneiforms, navicular, and cuboid bones and has a slope between a maximum height on the medial side of the foot support and a minimum height on the lateral side of the foot support. The foot support also includes a wedge fixed beneath the forefoot portion such that the maximum wedge height is positioned beneath the first metatarsal head and the minimum wedge height extends beneath the fourth metatarsal head. The foot support may optionally include a heel portion that supports the calcaneus and talus bones in a neutral, varus, or valgus positions.

U.S. Patent Publication No. 2013/0318819 generally describes a fabric-covered fluid-filled therapeutic foot orthotic with thong-cut device system comprising: a top substrate having fabric covering: a bottom substrate having fabric covering; a high viscosity fluid-filled arch supporting, massaging and comforting-medium; a series of dot welds placed distally of the metatarsal arch; a series of dot welds on a longitudinal arc through the medial arch; a longitudinal swatch weld towards the lateral mid-foot for directional flow and restriction of fluid towards the lateral mid foot; a rearwardly-placed half-moon shaped indentation; a front bladder seal seam; a heel dot weld; and a single forwardly-orientated indented trim line. The design permits the orthotic to be positioned into closed in shoes for transferring further towards the front of the thong cut sandal to provide a 'correct fit' without losing any effectiveness of the arch support or therapeutic value while eliminating all unnecessary trim lines.

U.S. Patent Publication No. 2015/0196086 generally describes a shoe in which an orthopedic adjustment has been integrated into the construction of the shoe itself. The invention entails adjusting one or more of the soles or other construction features of the shoe itself in order to accommodate a medical condition or treatment regimen. In particular, in instances of abnormalities in the knee joint, there is a need to redistribute the weight of the body from an afflicted symptomatic medial compartment of the knee to an un-afflicted and asymptomatic, or lesser effected and less symptomatic compartment so as to relieve the pain and stress at the most afflicted and most symptomatic compartment. Benefits are also achieved by reducing a common ankle injury, and by improving lateral cutting, cornering, and push off maneuvers. The present invention achieves all this by laterally wedging the sole of a shoe, where the angle is chosen to counter and redistribute the weight of the body accordingly thereby changing the axial load on the knee and ankle joints.

U.S. Patent Publication No. 2017/0181493 generally describes an interchangeable footwear device. The device may include a flip-flop sandal design wherein the device may include interchangeable structural features to allow a user to change features as associated with a particular terrain. The interchangeable footwear device includes a gripping system to traverse a number of different terrains. The footwear may include a sole member having a thong member attached to a top of the sole and a heel strap selectively attached to the sole. The heel strap may be selectively attached to the sole with a fastener that may be manually adjusted in a secured or unsecured position to remove the heel strap from the sole. In particular, the interchangeable footwear device may include a gripping unit selectively attached to the sole member of the footwear. The gripping unit may include a toe grip pad and a heel grip pad.

U.S. Patent Publication No. 2017/0295884 generally describes a footwear system for orthotic support comprising an insole region to which is affixed one or more detachable, repositionable receptacles that accommodate orthotic and/or foot support inserts, and optionally an additional heel receptacle. The footwear system may be usable to provide foot support in closed or open footwear.

U.S. Patent Publication No. 2018/0103721 generally describes a convertible shoe with interchangeable sole which consists of an upper to hold the foot and an interchangeable outsole. There is an attachment surface on the underside of the upper and an attachment surface on the topside of the outsole, and the two attachment surfaces are paired and configured to securely attach the two components while also being detachable to allow for the interchange of different outsoles having different tread surfaces. The attachment surfaces are a non-flat contoured shape. There are two protruding ridges on one surface, one substantially under the toe and the other under the heel and part of the arch. These mate with a recessed channel on the other surface. There is also attachment material on both surfaces that are mated and provide a secure attachment.

None of the art described above fully addresses the physiological and medical needs of a person suffering from foot-related problems while providing an insert that is inconspicuous when worn in the latest styles of open toe shoes.

BRIEF SUMMARY OF THE EMBODIMENTS

According to an aspect of the present invention, a multilayered orthopedic insole (or insert) is provided. The insole includes at least four cohesive layers, where the top or first layer includes leather, and the second layer is molded high-density recycled latex foam. The third layer is a molded, rigid density cork-EVA (Ethylene-Vinyl Acetate) footbed, and the fourth or bottom layer is moleskin or coated in moleskin to provide a natural grip on an interior surface of a shoe. The different layers are fused to form the orthopedic insole of the present invention.

The third layer of the multi-layered insole is generally thicker than the other three layers and includes sidewalls covered in a leather wrap. This provides a more aesthetically pleasing look to the insole given the exposed surfaces visible when wearing open toe footwear.

The multi-layered orthopedic insole is specifically designed to provide comfort and support to a user's foot using the specified materials, shapes, and contours. With this in mind, the multi-layered orthopedic insole includes a heel cup configured to cradle the heel of a user's foot. The heel cup includes a heel pad at its center to provide support and cushioning to the user's heel seated inside the heel cup.

The multi-layered orthopedic insole includes a lateral side and a medial side. The lateral and medial sides rise bilaterally forming a midsection of the insole thereby defining a cupped region for a user's foot. The insole further includes a raised ball pad support disposed at a front portion of the orthopedic insole. This feature provides cushioning and support for the ball or front portion of a user's foot.

The multilayered orthopedic insole may feature a bottom of the insole that has a slightly curved surface through the arch area and beveled sidewalls extend from the bottom of the insole at an angle of 30-40 degrees.

A method of manufacturing the multilayered orthopedic insole is also provided, which includes the steps of fusing at least four different layers. The first or top layer includes leather. The second layer includes molded high-density recycled latex foam. The third layer includes a molded, rigid density cork-EVA (Ethylene-Vinyl Acetate) footbed, and the fourth layer is a moleskin layer, or a layer coated with moleskin to provide a natural grip to an interior surface of a shoe. The layers are fused to form a cohesive orthopedic insole or insert.

The method further includes molding a heel cup into the heel portion of the orthopedic insole and molding a heel pad in the center of the heel cup. The heel pad provides support for the user's heel as it sits inside the heel cup.

The method further includes molding a raised ball pad support into a front portion of the multilayered orthopedic insole. The raised ball pad is designed to provide cushioning and comfort for the ball of the user's foot. The lateral and medial sides of the multilayered orthopedic insole rise bilaterally from a midsection of the multilayered orthopedic insole thereby defining a cupped region for a user's foot.

The third layer of the multi-layered orthopedic insole is thicker than the other layers and includes sidewalls. The sidewalls may be covered with a leather wrap to enhance the aesthetic qualities of the insole.

BRIEF DESCRIPTION OF THE SEVERAL VIEWS OF THE DRAWINGS

FIG. 2 shows a top view of an orthopedic shoe insole, according to an embodiment of the present invention.

FIG. 3 shows a bottom view of an orthopedic shoe insole, according to an embodiment of the present invention.

DETAILED DESCRIPTION OF THE EMBODIMENTS

Figure 1:
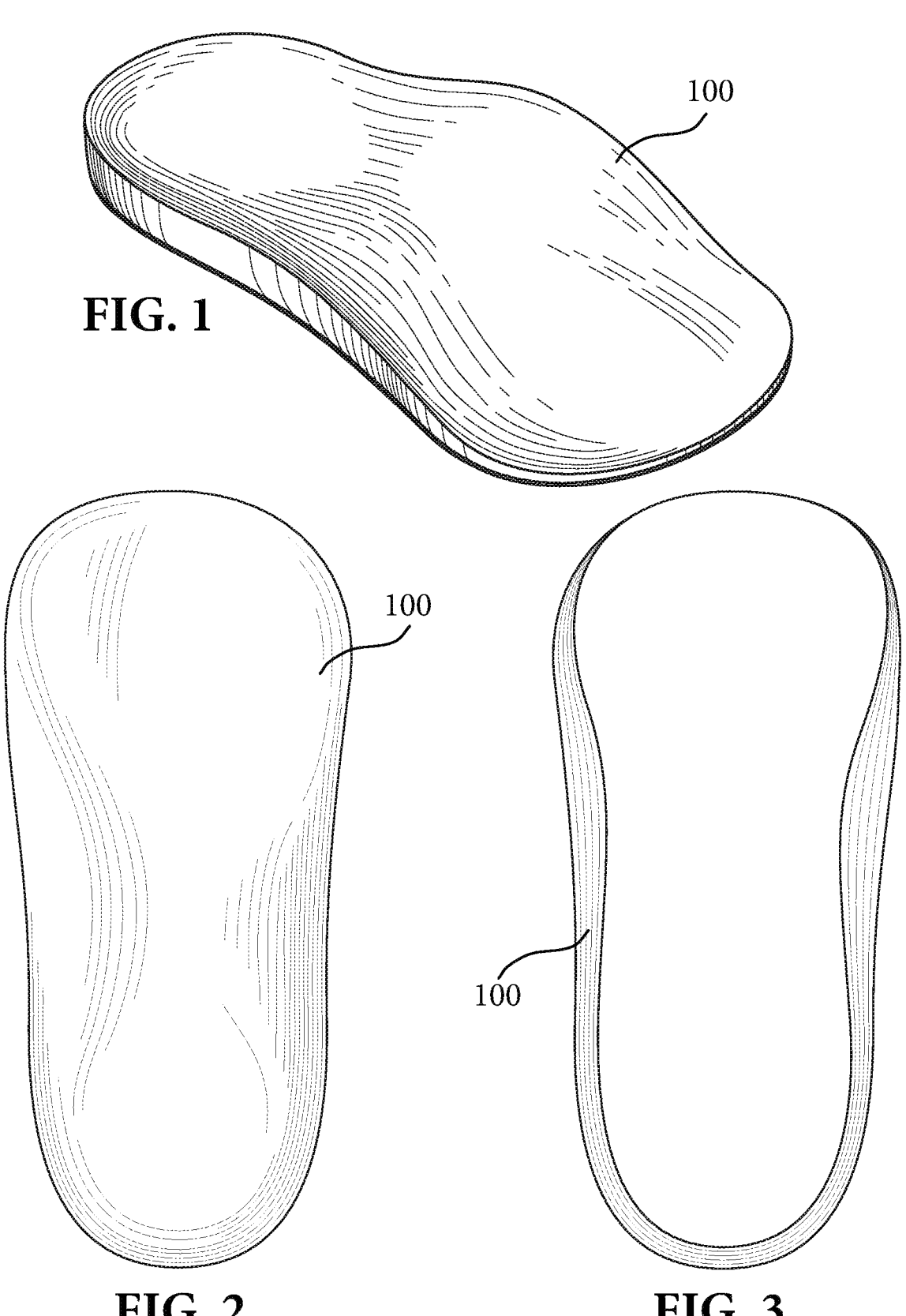
FIG. 1 shows a perspective view of an orthopedic shoe insole, according to an embodiment of the present invention.
Figures 4, 5, 6, 7:
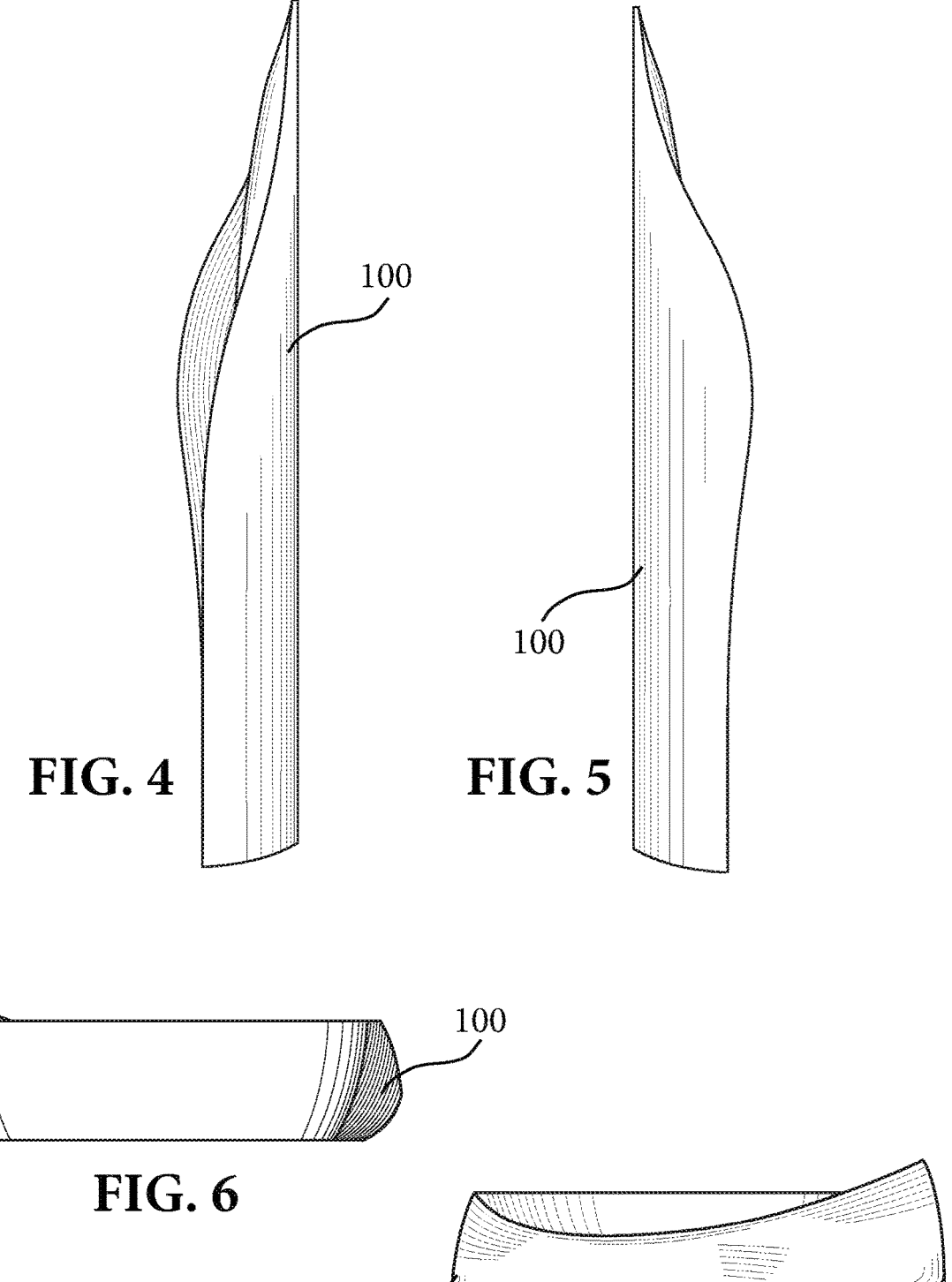
FIG. 4 shows a left-side view of an orthopedic shoe insole, according to an embodiment of the present invention.
FIG. 5 shows a right-side view of an orthopedic shoe insole, according to an embodiment of the present invention.
FIG. 6 shows a front view of an orthopedic shoe insole, according to an embodiment of the present invention.
FIG. 7 shows a rear view of an orthopedic shoe insole, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

For purposes of this continuation-in-part (CIP) application, the embodiment(s) reflected in FIGS. 11-14 is the preferred embodiment. Nevertheless, FIGS. 1-10 are still presented herein since the concept(s) embodied in FIGS. 1-10 represent the original or earlier concept upon which this application claims priority. The embodiment(s) reflected in FIGS. 11-14 represent an evolution or update of the original concept and thus should be considered the main or preferred embodiment(s).

Referring now to FIGS. 1-8, a perspective view (FIG. 1), top view (FIG. 2), bottom view (FIG. 3), left side view (FIG. 4), right side view (FIG. 5), front view (FIG. 6), rear view (FIG. 7), and exploded view (FIG. 8) of an orthopedic shoe insole 100 are illustratively depicted, in accordance with embodiments of the present invention.

As shown in FIGS. 1-7, the orthopedic shoe insole 100 is configured to provide support to the user, reducing and/or removing pain and/or aiding in posture and/or providing support to treat one or more of a number of foot-related medical issues such as, e.g., plantar fasciitis.

According to an embodiment, the shape of the orthopedic shoe insole 100 is configured to fit in most flat sandals. It may be small enough to be discreet but molded for support. According to an embodiment, the orthopedic shoe insole 100 comes in various sizes, for left and/or right feet. According to an embodiment, the orthopedic shoe insole 100 is customized to form to a specific user's foot.

Figure 8:
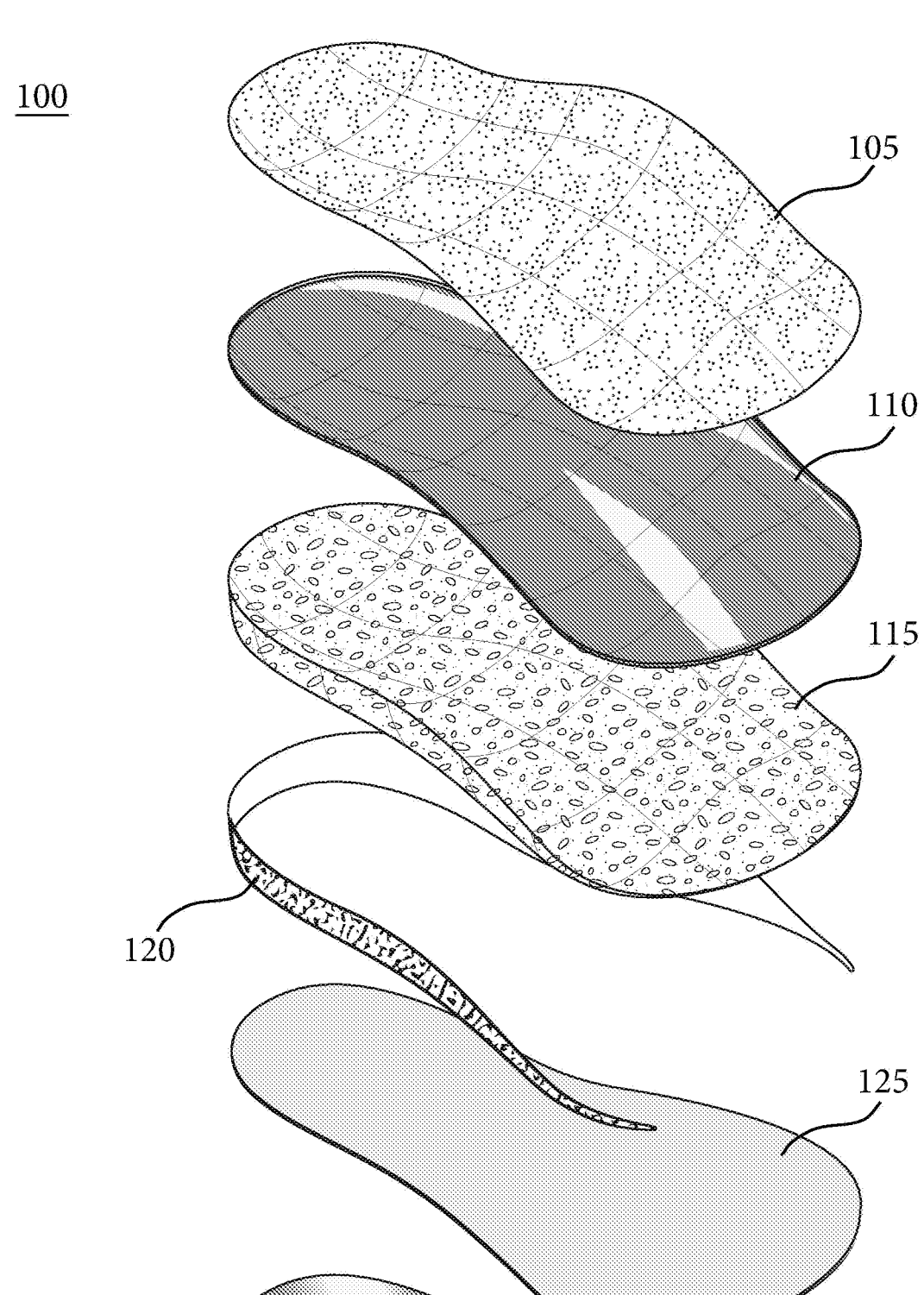
FIG. 8 shows an exploded view of an orthopedic shoe insole, according to an embodiment of the present invention.

As shown in FIG. 8, the orthopedic shoe insole 100 includes a plurality of materials. According to an embodiment, the orthopedic shoe insole 100 includes a finished top layer 105 and/or a finished sidewall layer 120. According to an embodiment, the finished top layer 105 and finished sidewall layer 120 are configured such that the orthopedic shoe insole 100 has a finished appearance and/or are configured to blend in with the footwear with which the orthopedic shoe insole 100 is intended to be used. According to an embodiment, the top layer 105 and/or the sidewall layer 120 include leather, faux leather, and/or any other suitable material or materials. According to an embodiment, the top layer 105 is perforated. According to an embodiment, the top layer 105 and the sidewall layer 120 are separate components. According to an embodiment, the top layer 105 and the sidewall layer 120 are a singular component. According to an embodiment, the top layer 105 may encompass the entire insole 100.

The finished appearance of the orthopedic shoe insole 100 due to the top layer 105 and the sidewall layer 120 enables the shoe to be used with open footwear, such as sandals, while still giving the footwear a finished look, as opposed to the look of other forms of orthopedic shoe insoles, which typically only have fabric or plastic exteriors.

According to an embodiment, below the top layer 105 is a thermoplastic polyurethane (TPU) molded layer 110. According to an embodiment, the TPU layer 110 is thicker in the center of the orthopedic shoe insole 100 and tapers thin around the edges of the orthopedic shoe insole 100. According to an embodiment, the thickest portion of the TPU layer 110 is approximately 2 mm. It is noted, however, that any suitable thickness may be used, while maintaining the spirit of the present invention. According to an embodiment, other types of hardenable material in addition to TPU or instead of TPU may also be used for layer 110, while maintaining the spirit of the present invention.

According to an embodiment, below the TPU molded layer 110 is a cork layer 115. According to an embodiment, the cork layer 115 is molded into shape. According to an embodiment, the cork layer 115 tapers in the toe region of the orthopedic shoe insole 100. The TPU molding layer 110 and the cork layer 115 provide support, structure, and absorption for the user of the orthopedic shoe insole 100. According to an embodiment, the sidewall layer 120 wraps around the TPU layer 110 and the cork layer 115.

According to various embodiments of the present invention, the insole 100 may solely have a TPU layer 110, may solely have a cork layer 115, and/or may have both a TPU layer 110 and a cork layer 115. According to various embodiments, the order of the TPU layer 110 and the cork layer 115 may be reversible.

According to an embodiment, a bottom layer 125 is located below the cork layer 115. According to an embodiment, the bottom layer 125 is relatively flat and covers the entire bottom surface area of the orthopedic shoe insole 100. According to an embodiment, the bottom layer is printed, although it is noted that any suitable method for forming the bottom layer 125 may be used while maintaining the spirit of the present invention. According to an embodiment, the bottom layer 125 includes silicone. It is noted, however, that any suitable material or materials may be used in the formation of the bottom layer 125, while maintaining the spirit of the present invention.

Figure 9:
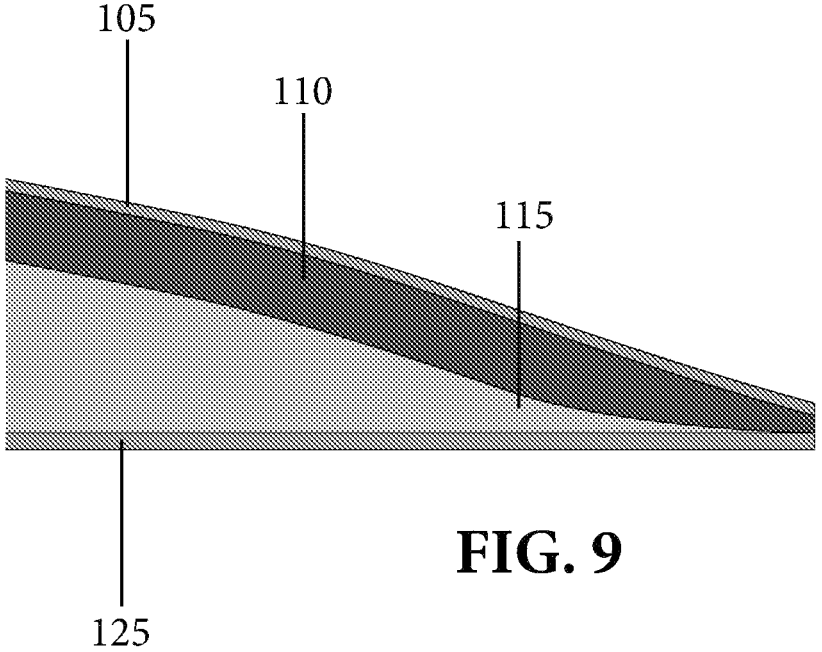
FIGS. 9-10 show material visualizations of an orthopedic shoe insole, according to embodiments of the present invention.
Figure 10:
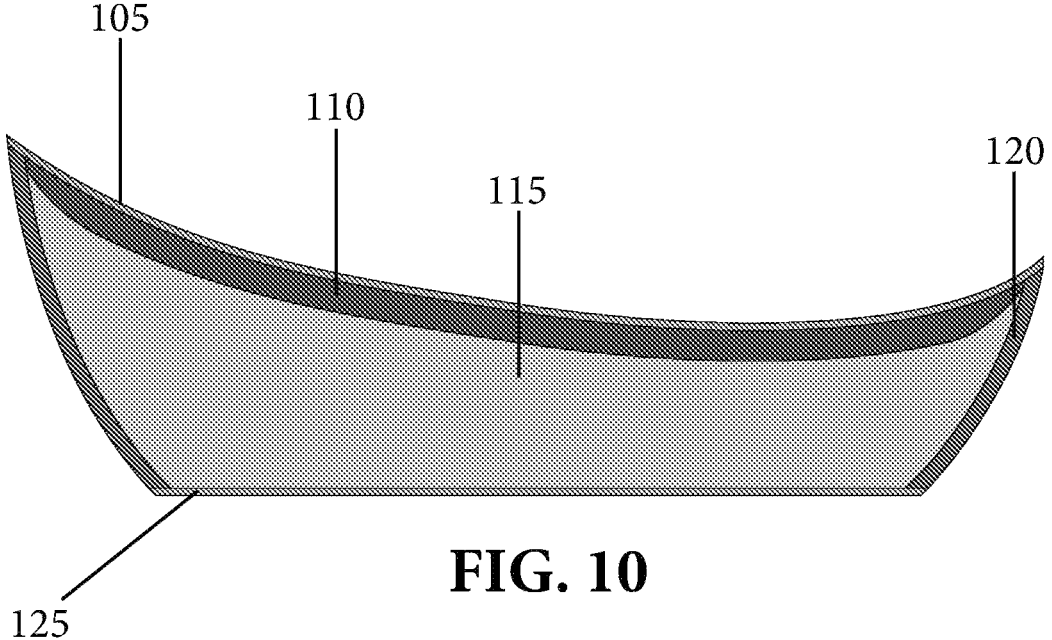

Sectional views of the layers of an embodiment of the orthopedic shoe insole 100 can further be seen in the material visualizations shown in FIGS. 9-10.

According to an embodiment, the orthopedic shoe insole 100 may include an adhesive layer 130 on the underside of the orthopedic shoe insole 100. According to an embodiment, the adhesive layer 130 may cover all or a portion of the bottom layer 125 of the orthopedic shoe insole 100.

According to an embodiment, the adhesive layer 130 covers a heel portion of the orthopedic shoe insole 100. The adhesive layer 130 is configured to secure the orthopedic shoe insole 100 to the footwear with which the orthopedic shoe insole 100 is intended for use. For open footwear, the adhesive layer 130 prevents the orthopedic shoe insole 100 from falling out of place or falling off of the open footwear. According to an embodiment, the adhesive layer 130 may be a double-sided adhesive layer. It is noted, however, that any suitable form of adhesive layer 130 may be used while maintaining the spirit of the present invention.

Figure 11:
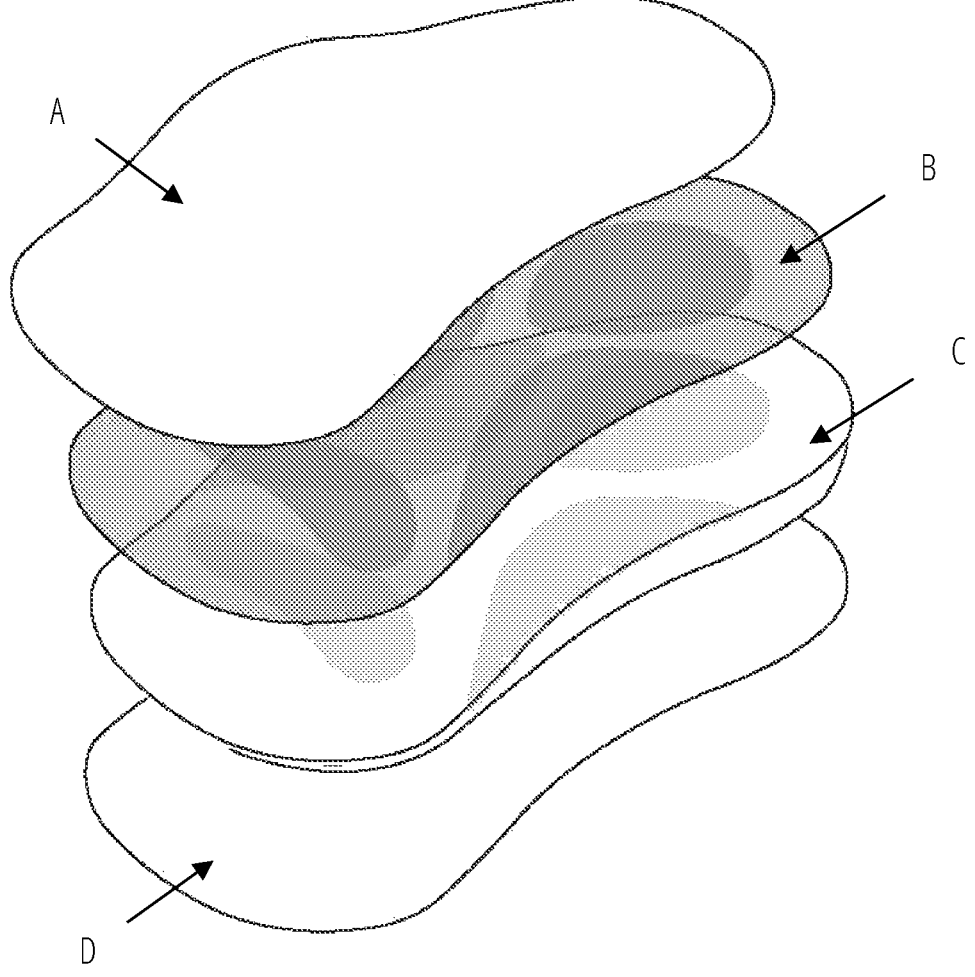
FIG. 11 shows an exploded view of an orthopedic shoe insole, according to another embodiment of the present invention.

According to a new embodiment illustrated in FIG. 11, the orthopedic shoe insole 100 is a multi-layered cohesive shoe insole. According to FIG. 11, the multi-layered insole includes four distinct layers fused together to form the insole, but one of ordinary skill in the art will appreciate that more or less than four layers may be used to form the multi-layered insole. Layer A (also referred to as the first or top layer; i.e., the layer that comes in direct contact with the bottom of a user's foot) is made of leather. This layer is preferably 0.8-1.0 mm in thickness and is preferably vegetable tanned and chrome-free goat or calf leather. However, other ranges of thickness may be used, as well as other or no tanning processes, and other sources of leather besides goat or calf.

Layer B (also referred to as the second layer or first intermediate layer) is an ADETEX high-density recycled molded latex foam layer and is preferably 1.5-2 mm in thickness. However, the thickness is not limited to this range.

Layer C (also referred to as the third layer or second intermediate layer) is a molded cork and EVA (Ethylene-Vinyl Acetate) hybrid footbed with built-in medial and lateral arch support as well as support for the ball of the foot. Layer C includes a contoured heel cup (for cradling the heel) with center support in the form of a heel pad, disposed centrally in the heel cup, for shock absorption and high rigidity. Layer D (also referred to as the fourth layer or bottom layer) is moleskin or moleskin coated for slip resistance and is preferably 1.8-2 mm in thickness. However, the thickness is not limited to this range.

Referring back to Layer C, this layer includes sidewalls E which are preferably covered by a leather wrap. The leather wrap is preferably 0.8-1.0 mm in thickness and is vegetable tanned and chrome-free goat or calf leather. However, the wrap and layers described herein are not limited to a particular thickness, tanning process, or source.

Together, the four layers A, B, C, and D are combined to form a multilayered orthopedic shoe insole for closed and open toe footwear offering a fused combination of vegetable tanned leather and molded HD (high-density) recycled latex foam over a molded, rigid density cork-EVA footbed with custom designed arch, ball, and heel support for optimal foot alignment and foot pain relief. The insole side walls are also wrapped in vegetable tanned leather for a fashion element and the moleskin coated bottom layer provides a natural grip for gripping the insole of a shoe.

Figures 12A, 12B, 12C:
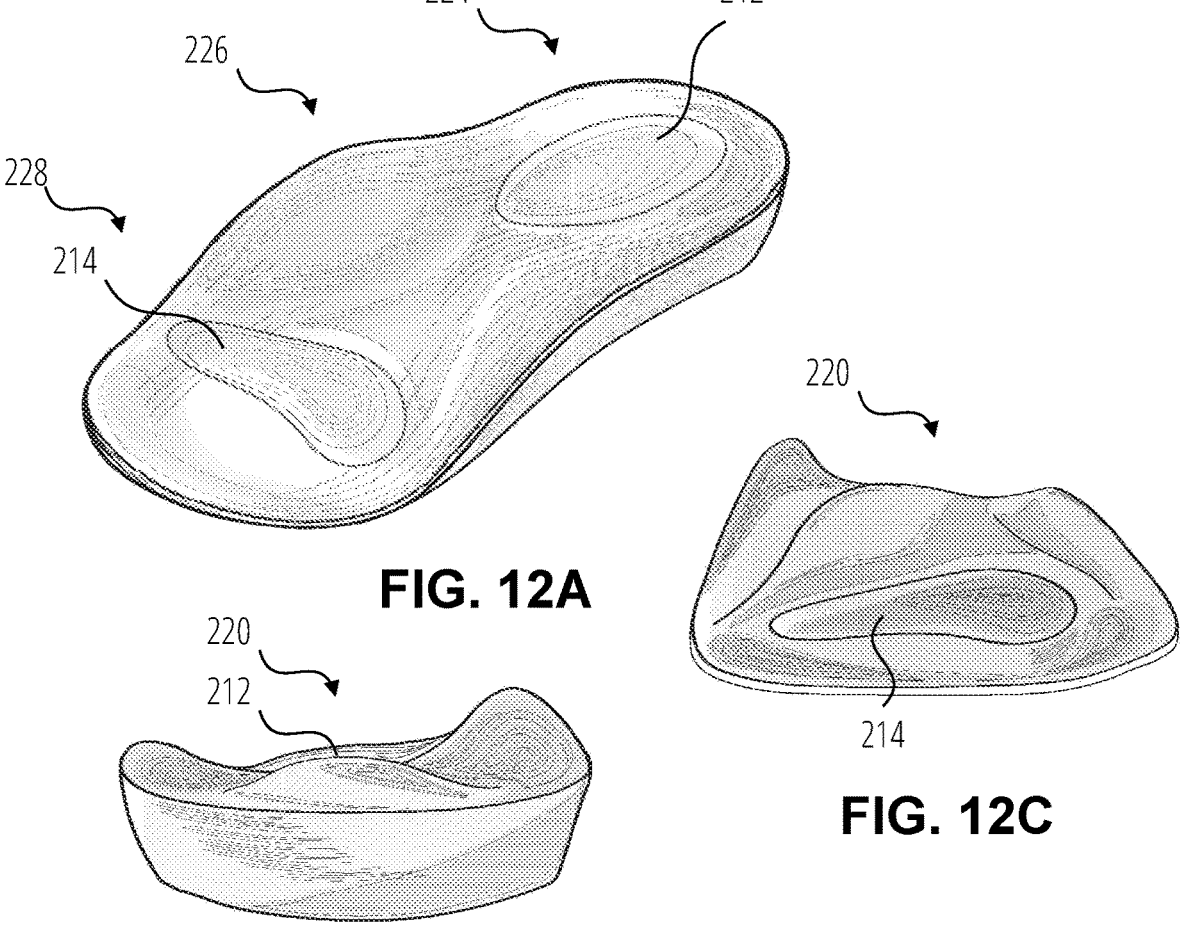
FIG. 12A shows a perspective view of the orthopedic shoe insole of FIG. 11, according to an embodiment of the present invention.
FIG. 12B shows a perspective rear view of the orthopedic shoe insole of FIG. 12A, according to an embodiment of the present invention.
FIG. 12C shows a perspective front view of the orthopedic shoe insole of FIG. 12A, according to an embodiment of the present invention.

FIGS. 12A-C show different perspective views of the multilayered orthopedic insole of FIG. 11 in its fused form. FIG. 12A is a perspective view of the multilayered orthopedic insole, FIG. 12B is a front perspective view of the multilayered orthopedic insole and FIG. 12C is a rear perspective view of the multilayered orthopedic insole. The multilayered insole includes a heel portion 224, a mid-section 226, and a front portion 228. As shown in FIGS. 12B and 12C, a heel cup area 220 is defined by a depression in the heel portion 224 and/or raised lateral and medial sides (310 and 312, respectively) of the insole, which flanks the heel portion. The heel cup 220 is configured to cradle a user's heel, thus providing stability and comfort to the user while standing, sitting, or walking.

Figures 13A, 13B, 13C, 13D, 13E, 13F:
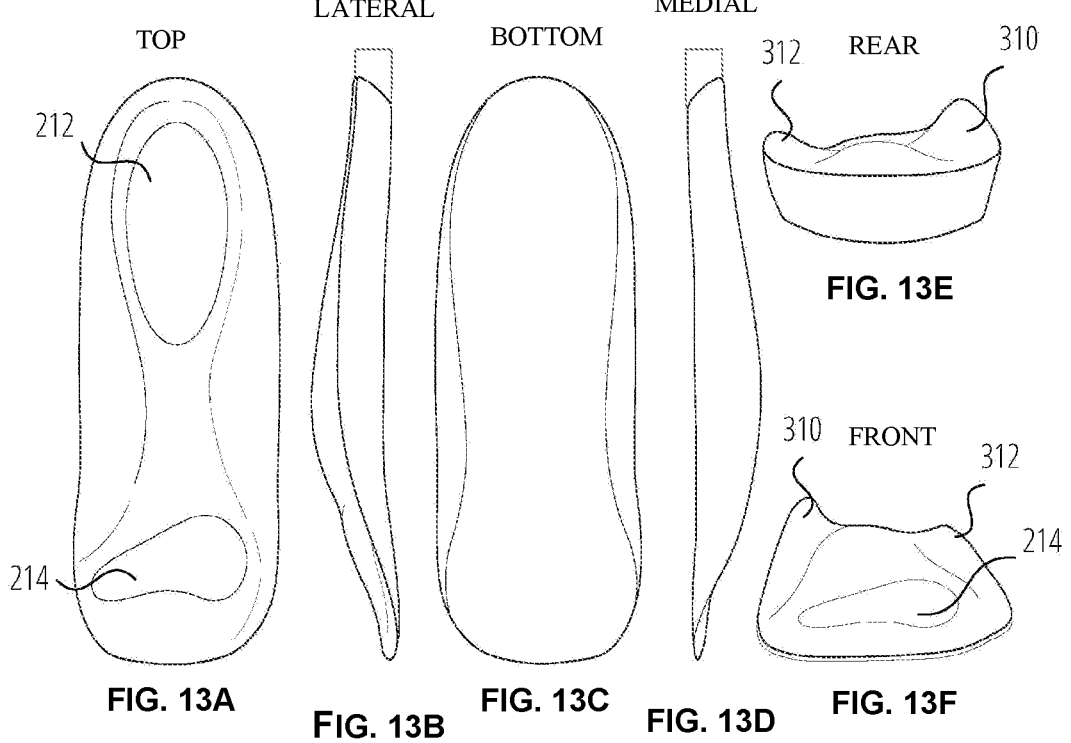
FIG. 13A shows a top plan view of the orthopedic shoe insole of FIG. 12A, according to an embodiment of the present invention.
FIG. 13B shows a lateral side view of the orthopedic shoe insole of FIG. 12A, according to an embodiment of the present invention.
FIG. 13C shows a bottom plan view of the orthopedic shoe insole of FIG. 12A, according to an embodiment of the present invention.
FIG. 13D shows a medial side view of the orthopedic shoe insole of FIG. 12A, according to an embodiment of the present invention.
FIG. 13E shows a rear elevation view of the orthopedic shoe insole of FIG. 12A, according to an embodiment of the present invention.
FIG. 13F shows a front elevation view of the orthopedic shoe insole of FIG. 12A, according to an embodiment of the present invention.

FIGS. 13A and 13E show a top view and rear view, respectively, of the orthopedic insole of FIG. 12A. As can be seen, the insole includes a raised heel pad 212 protruding from the heel cup area 220. The heel pad is preferably about 50×35 mm with a maximum height of about 3 mm. The heel pad tapers off into the surrounding heel cup area. The heel pad 212 provides a rigid support to the user's heel while the heel is seated in the heel cup. The width of the heel section of the insole is preferably about 75 mm.

Turning to the mid-section of the multilayered insole illustrated in FIG. 13A, the insole is dimensioned as a contoured cup for cradling a user's foot. A waist of mid-section 226 is about 72 mm wide and rises from a central depression to raised medial and lateral sides, respectively. The lateral side 310 and medial side 312 include built-in arch support, i.e., each is configured to provide arch support on their respective sides.

FIG. 13B is a side perspective view of the insole of FIG. 12A. As illustrated in FIG. 13B, the insole mid-section has a thickness of about 14.5 mm and the bottom side of the insole (i.e., the side in contact with the insole of the shoe) is not entirely flat. Rather, it maintains a slight curve along the arch area for firm support.

According to FIG. 13A, the front portion 228 of the multi-layered orthopedic insole includes a raised ball pad support 214. The raised ball pad support may have an irregular reniform shape and has a length of about 55 mm and a variable width. The width of one side of the ball pad support is preferably about 12 mm, with the width increasing around the middle of the ball pad to about 15 mm and increasing further at an opposite side to about 25 mm. The ball pad support has a maximum height relative to the surrounding surface of about 3 mm and tapers down into the surrounding surface. The ball pad 214 provides support and cushioning to the ball of a user's foot. Specifically, the reniform shape of the ball pad provides maximum comfort and support to the front portion of the foot. However, the ball pad is not limited to this shape and other shapes may be used to provide cushioning and support for the ball of the user's foot.

The width of the insole at the front is about 77 mm. The length of the entire insole is about 176 mm.

FIG. 13B shows a lateral side view of the multilayered insole. The thickness of the insole is about 14.5 mm around its midline (i.e., a transverse line bisecting the insole). However, as stated elsewhere, the specified thickness and other dimensions should be considered non-limiting. FIG. 13B also illustrates the sloping contours of the insole which is designed to provide comfort and relieve pressure from the user's foot while standing or walking.

FIG. 13C shows a bottom view of the multilayered insole of FIG. 12A. As can be seen, the sidewalls are angled at about a 30-40-degree beveled angle. FIG. 13D shows a medial side view of the multilayered insole and its sloping contours.

FIGS. 13E and 13F are rear and front views, respectively, of the multilayered orthopedic insole. As shown in FIG. 13E the thickness of the orthopedic insole at the rear is about 18 mm. The cork-EVA mold used for layer C tapers to about 2 mm in thickness at a front edge of the orthopedic insole shown in FIG. 13F. FIGS. 13E and 13F also show the sloping contours of the insole.

Figure 14:
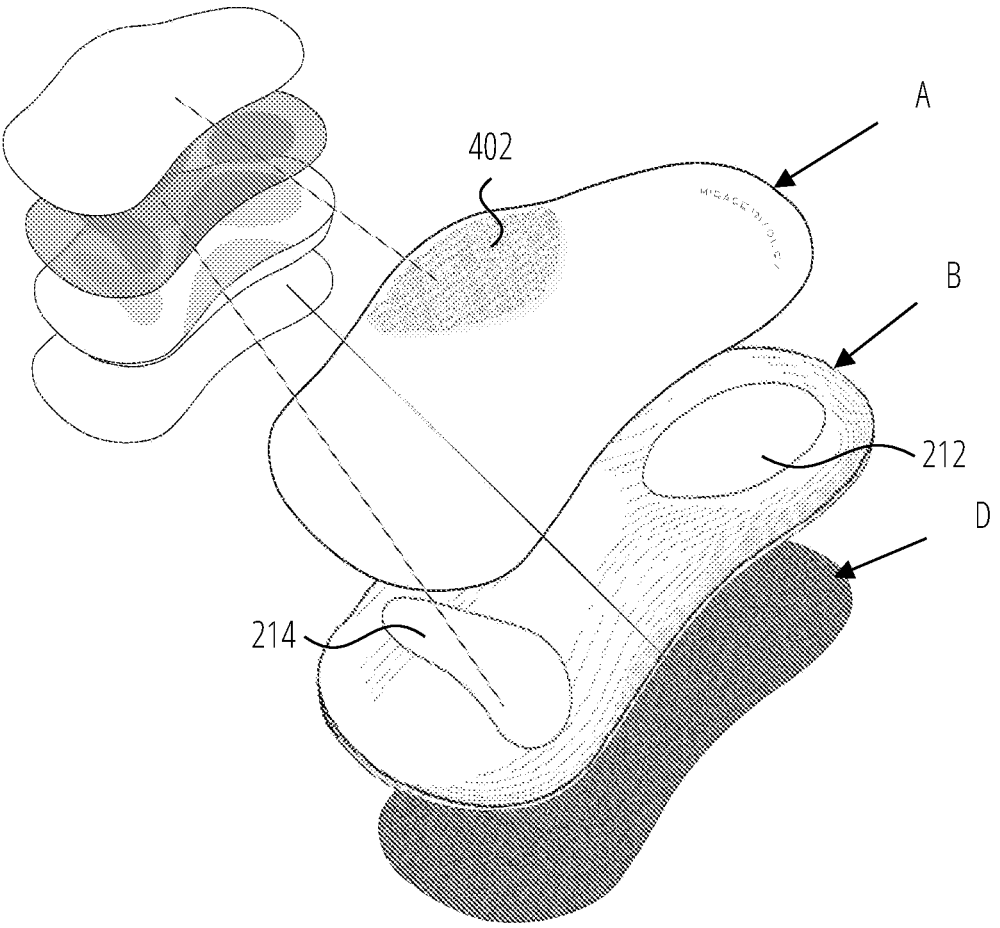
FIG. 14 shows an enlarged view of some of the layers of FIG. 11, according to an embodiment of the present invention.

FIG. 14 shows an enlarged view of some of the layers illustrated in FIG. 11. Layer A and sidewalls E both include vegetable tanned leather insock. Specifically, layer A is a vegetable tanned leather insock with medial arch ventilation and is about 0.8-1 mm in thickness. The shaded area 402 shown in layer A represents a protruding area of medial arch support. Sidewalls E may be covered or wrapped in vegetable tanned leather for aesthetic appeal. Layer B is preferably made from ADETEX high-density recycled latex foam with a density rating of (D-80) and is about 1.5-2 mm in total thickness throughout. The edges are tapered for even skiving. The shape and contours of Layer B mirror and conform to the shape of Layer A. Layer D is a moleskin backer having a thickness of about 1.8-2 mm. A logo may be printed or embossed on the top layer (i.e., layer A) such as on the heel section of the insole.

As can be seen, the contoured slopes, heel cup, heel pad, ball pad, raised medial and lateral sides, and midsection are configured to relieve pressure points of the foot, and provide cushioned support, while also providing proper weight distribution for the foot when the user is standing or walking. In addition, the specified dimensions and overall shape of the multi-layered insole create an inconspicuous profile for the insole when it gets inserted into a shoe so that it does not detract from the style and aesthetic aspects of the shoe.

Although the different layers of the multilayered orthopedic insole are described as having preferred dimensions, materials, and shapes to achieve maximum comfort, support, and alignment for the user's foot, other dimensions, materials, or shapes may be used. Therefore, the specified dimensions and materials should be considered non-limiting.

When introducing elements of the present disclosure or the embodiment(s) thereof, the articles "a," "an," and "the" are intended to mean that there are one or more of the elements.

Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A multilayered, orthopedic shoe insole, comprising:
a top layer comprising leather,
wherein the top layer has a thickness of about 0.8 mm to about 1.0 mm;
a first intermediate layer, directly affixed to an underside of the top layer, comprising molded high-density recycled latex foam,
wherein the first intermediate layer has a thickness of about 1.5 mm to about 2.0 mm;
a second intermediate layer, directly affixed to an underside of the first intermediate layer, comprising a molded, rigid cork-EVA (Ethylene-Vinyl Acetate) footbed; and
a bottom layer, directly affixed to an underside of the second intermediate layer, coated in moleskin to provide a natural grip on a shoe insole,
wherein the bottom is layer has a thickness of about 1.8 mm to about 2.0 mm;

wherein, the top layer, the first intermediate layer, the second intermediate layer, and the bottom layer are fused together to form the multilayered, orthopedic shoe insole.

2. The multilayered, orthopedic shoe insole as recited in claim 1, wherein the second intermediate layer includes sidewalls covered in a leather wrap, wherein the leather wrap has a thickness of about 0.8 mm to about 1.0 mm.

3. The multilayered, orthopedic shoe insole of claim 2, wherein the leather wrap is a tanned leather.

4. The multilayered, orthopedic shoe insole of claim 1, wherein the top layer leather is a tanned, faux leather, chrome-free, goat, or calf leather.

5. The multilayered, orthopedic shoe insole of claim 1, further comprising:
a heel cup configured to cradle a heel of a user's foot.

6. The multilayered, orthopedic shoe insole of claim 5, further comprising:
a heel pad disposed centrally in the heel cup.

7. The multilayered, orthopedic shoe insole of claim 6, further comprising:
a lateral side and a medial side, wherein the lateral and medial sides rise bilaterally from a midsection of the multilayered, orthopedic shoe insole thereby defining a cupped region for a user's foot.

8. The multilayered, orthopedic shoe insole of claim 7, further comprising:
a raised ball pad support disposed at a front portion of the multilayered, orthopedic shoe insole.

9. The multilayered, orthopedic shoe insole of claim 8, wherein the raised ball pad is reniform in shape.

10. The multilayered, orthopedic insole of claim 1, wherein the second intermediate layer tapers to about 2 mm in thickness at a front edge of the insole.

11. A multilayered, orthopedic shoe insole for use in an article of footwear having an open toe, the multilayered, orthopedic shoe insole consisting of:
a top layer having a finished upper surface,
wherein the finished upper surface is selected to blend in with the article of footwear having the open toe in which the multilayered, orthopedic shoe insole is configured to be inserted;
a first intermediate layer, directly affixed to a bottom of the top layer, comprising molded high-density recycled latex foam;
a second intermediate layer, directly affixed to a bottom of the first intermediate layer, comprising a molded, rigid cork-EVA (Ethylene-Vinyl Acetate) footbed,
wherein the second intermediate layer tapers to about 2 mm in thickness at a front edge of the insole;
a bottom layer, directly affixed to a bottom of the second intermediate layer, coated in moleskin to provide a natural grip on a shoe insole;
a leather wrap configured to cover a sidewall of the second intermediate layer;
a raised, reniform-shaped pad support disposed at a front of the multilayered, orthopedic shoe insole,
wherein a first end of the raised, reniform-shaped pad support has a width of about 12 mm and a second end of the raised, reniform-shaped pad support has a width of about 25 mm, and
wherein the first end is opposite the second end;
wherein sidewalls extending from a bottom of the insole to a top of the insole are beveled and extend at an angle from 30 to 40 degrees;
and wherein, the top layer, the first intermediate layer, the second intermediate layer, and the bottom layer are fused together to form the multilayered, orthopedic shoe insole that is configured to be inserted into the article of footwear having the open toe.

12. An article of footwear having an open toe and multilayered orthopedic shoe insole system, the system comprising:

the article of footwear having a footbed and an upper portion with the upper portion having the open toe, wherein the footbed is configured to receive the multilayered orthopedic shoe insole; and the multilayered orthopedic shoe insole consisting of:

a top layer having a finished upper surface, wherein the finished upper surface is selected to blend in with the article of footwear having the open toe;

a first intermediate layer, directly affixed to a bottom of the top layer, comprising molded high-density latex foam;

a second intermediate layer, directly affixed to a bottom of the first intermediate layer, comprising a rigid cork-EVA (Ethylene-Vinyl Acetate) footbed;

a bottom layer, directly affixed to a bottom of the second intermediate layer, with a bottom surface of the bottom layer being coated in moleskin;

a leather wrap configured to cover a sidewall of the second intermediate layer;

a raised, reniform-shaped pad support disposed at a front of the multilayered, orthopedic shoe insole; and wherein, the top layer, the first intermediate layer, the second intermediate layer, and the bottom layer are fused together to form the multilayered orthopedic shoe insole.

\* \* \* \* \*